United States Patent
Beltran

(10) Patent No.: US 9,598,812 B1
(45) Date of Patent: Mar. 21, 2017

(54) DISHCLOTH DRYING APPARATUS AND METHOD

(71) Applicant: Nancy L. Beltran, Murrieta, CA (US)

(72) Inventor: Nancy L. Beltran, Murrieta, CA (US)

(*) Notice: Subject to any disclaimer, the term of this patent is extended or adjusted under 35 U.S.C. 154(b) by 0 days.

(21) Appl. No.: 14/883,041

(22) Filed: Oct. 14, 2015

(51) Int. Cl.
*D06F 57/00* (2006.01)
*A47J 47/16* (2006.01)

(52) U.S. Cl.
CPC ............ *D06F 57/00* (2013.01); *A47J 47/16* (2013.01)

(58) Field of Classification Search
CPC .......... D06F 57/00; D06F 57/06; D06F 57/08; D06F 59/002; A47J 47/16
See application file for complete search history.

(56) References Cited

U.S. PATENT DOCUMENTS

| | | | | |
|---|---|---|---|---|
| 356,380 | A * | 1/1887 | Scribner | A47K 10/04 211/16 |
| 1,734,532 | A | 11/1929 | Sacerdote | |
| 2,084,854 | A * | 6/1937 | McCarthy | D06F 59/02 108/119 |
| 2,931,514 | A * | 4/1960 | Hughes | A47J 47/20 211/123 |
| 3,018,899 | A * | 1/1962 | Groo | D06F 57/08 211/123 |
| 3,295,694 | A * | 1/1967 | Nejezchleb | A47L 19/04 211/12 |
| 3,355,030 | A | 11/1967 | Cathcart | |
| 5,188,244 | A * | 2/1993 | Hollstegge | D06F 59/00 211/13.1 |
| 5,217,123 | A * | 6/1993 | Riley | A47K 10/08 211/105.1 |
| 5,369,893 | A | 12/1994 | Perito | |
| 5,406,717 | A * | 4/1995 | Dofka | F26B 21/008 211/37 |
| 5,592,750 | A * | 1/1997 | Eichten | D06F 59/02 223/70 |
| 5,865,325 | A * | 2/1999 | Comstock | A47K 10/08 211/119.009 |
| 6,557,567 | B2 * | 5/2003 | Mood | A47L 15/505 134/22.18 |
| 6,640,982 | B1 * | 11/2003 | Bjerke | F26B 25/18 211/85.15 |
| 7,083,055 | B1 * | 8/2006 | Ambrosat | D06F 57/06 211/38 |
| 7,475,785 | B1 * | 1/2009 | Kidd | A47L 19/02 211/200 |
| 8,162,320 | B2 * | 4/2012 | Medina | F41J 1/10 273/407 |
| 8,973,763 | B2 * | 3/2015 | Pargansky | A47L 19/04 211/16 |

(Continued)

*Primary Examiner* — Leslie A Nicholson, III
*Assistant Examiner* — Kimberley S Wright

(57) ABSTRACT

A dishcloth drying apparatus and method includes a countertop and a support positioned on the countertop such that the support extends upwardly from the countertop. The support includes a panel that has an upper surface and a perimeter edge. A holder for supporting a dishcloth in spaced relationship from the panel is attached to the panel. The holder includes a pair of legs and each of the legs is attached to and extends upwardly from the upper surface. A rod is attached to and extends between the legs. A dishcloth, when wet, is positioned on the rod of the support such that the dishcloth hangs from the support and dries.

1 Claim, 4 Drawing Sheets

(56) References Cited

U.S. PATENT DOCUMENTS

| | | | |
|---|---|---|---|
| 9,370,277 B2 * | 6/2016 | Weaver | A47J 37/0786 |
| 2009/0172876 A1 | 7/2009 | Hendrickson et al. | |
| 2010/0072147 A1 * | 3/2010 | Reenberg | A47K 10/10 |
| | | | 211/45 |
| 2011/0108682 A1 * | 5/2011 | Boaz | A47B 81/00 |
| | | | 248/99 |
| 2014/0251930 A1 * | 9/2014 | Pargansky | A47L 19/04 |
| | | | 211/16 |
| 2016/0088967 A1 * | 3/2016 | Moli | A47J 47/20 |
| | | | 211/86.01 |

* cited by examiner

DISHCLOTH DRYING APPARATUS AND METHOD

BACKGROUND OF THE DISCLOSURE

Field of the Disclosure

The disclosure relates to cloth drying devices and more particularly pertains to a new cloth drying device for drying dishcloths and retaining them in an easily accessible location relative to a sink.

SUMMARY OF THE DISCLOSURE

An embodiment of the disclosure meets the needs presented above by generally providing a countertop and a support positioned on the countertop such that the support extends upwardly from the countertop. The support includes a panel that has an upper surface and a perimeter edge. A holder for supporting a dishcloth in spaced relationship from the panel is attached to the panel. The holder includes a pair of legs and each of the legs is attached to and extends upwardly from the upper surface. A rod is attached to and extends between the legs. A dishcloth, when wet, is positioned on the rod of the support such that the dishcloth hangs from the support and dries.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
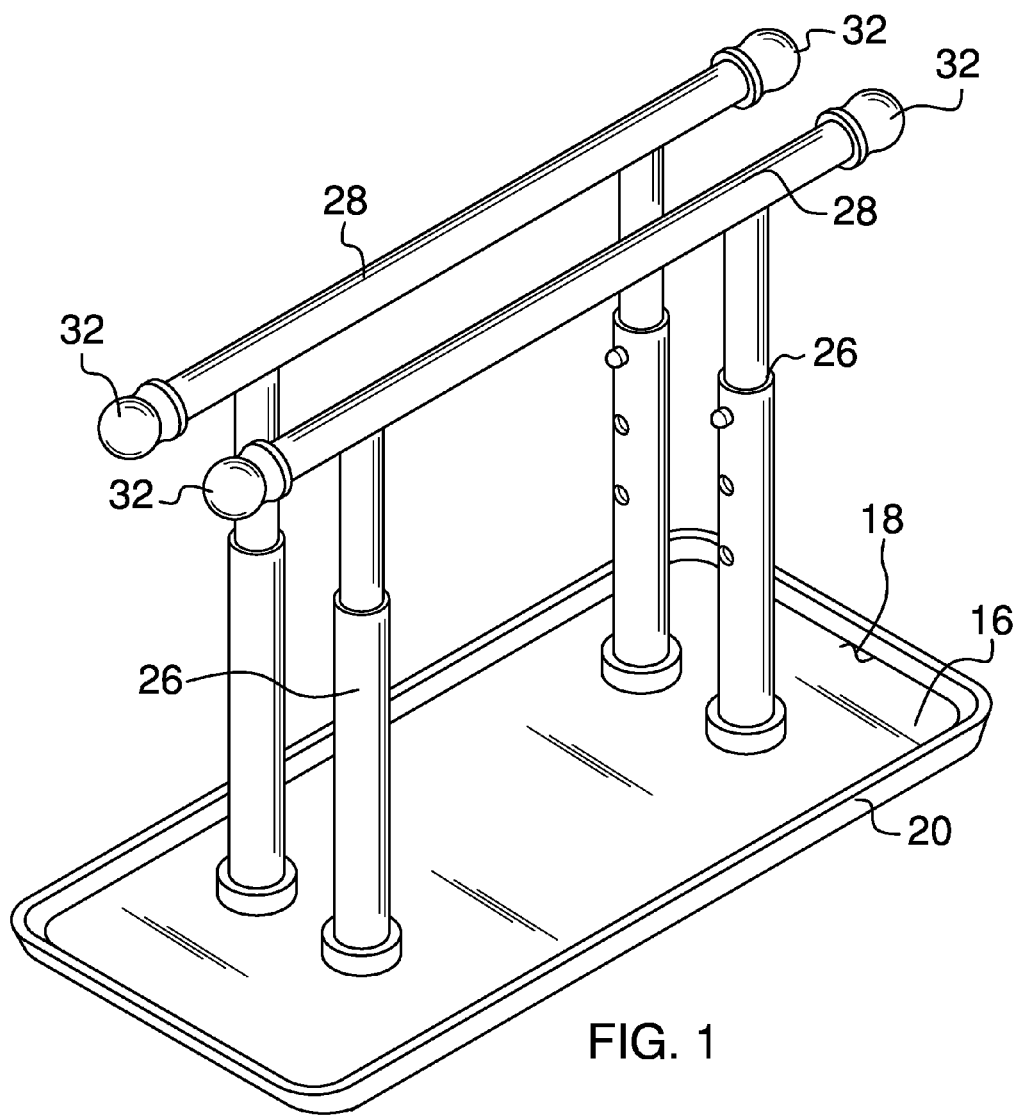
FIG. 1 is a front perspective view of a dishcloth drying apparatus and method according to an embodiment of the disclosure.

With reference now to the drawings, and in particular to FIGS. 1 through 4 thereof, a new cloth drying device embodying the principles and concepts of an embodiment of the disclosure and generally designated by the reference numeral 10 will be described.

As best illustrated in FIGS. 1 through 4, the dishcloth drying apparatus 10 and method generally comprises providing a countertop 12. The countertop 12 may include one adjacent to a sink 14 used for washing dishes, eating utensils and the like. A support 15 is positioned on the countertop 12 and may be placed adjacent to the sink 14 such that the support 15 extends upwardly from the countertop 12. The support 15 includes a panel 16 having an upper surface 18 and a perimeter edge 20. The upper surface 18 is planar and the perimeter edge 20 may be formed into an upwardly extending lip. The panel 16 may have a length and width each being less 18 inches.

Figure 2:
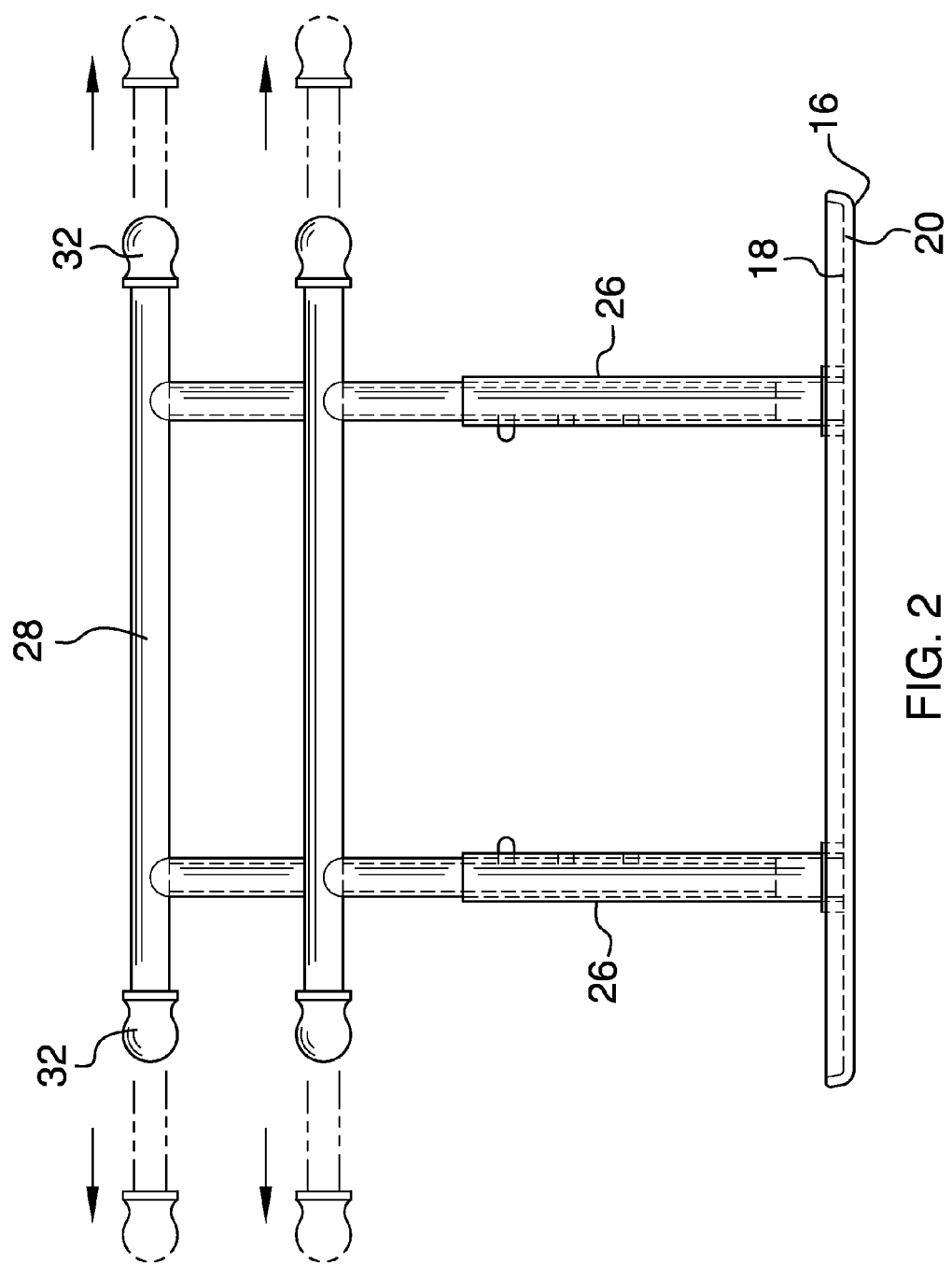
FIG. 2 is a front view of an embodiment of the disclosure.
Figure 3:
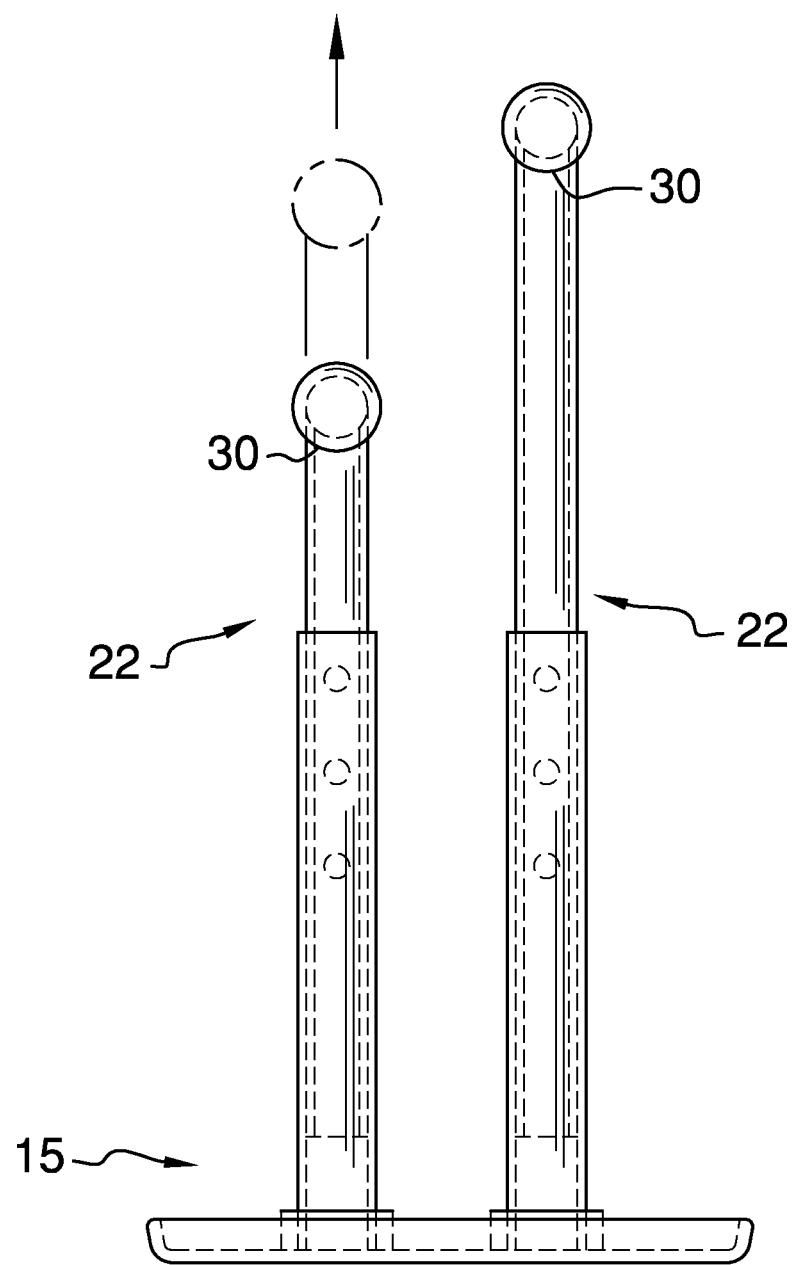
FIG. 3 is a side view of an embodiment of the disclosure.

The support 15 further includes at least one, and up to a pair of holders 22. Each of the holders 22 is configured to support a dishcloth 24 in spaced relationship from the panel 16. Each of the holders 22 includes a pair of legs 26. Each of the legs 26 is attached to and extends upwardly from the upper surface 18. The legs 26 may each be telescopic to have a selectively adjustable height. The legs 26 each have a maximum height that is less than 12 inches. The legs 26 are spaced from each other a distance of between 6 inches and 12 inches. A rod 28 is attached to and extends between the legs 26. The rod 28 is attached to an upper end 30 of a respective one of the legs 26 and has a length between 6 inches and 12 inches. The rod 28 may extend outwardly beyond the legs 26 and have a pair of terminal ends 32 each comprising a bulbous member. The holders 22 are spaced from each other a distance of between 2 inches and 6 inches and the rods 28 of the holders 22 are oriented parallel to each other. The rods 28 may also be telescopic as shown in FIG. 2.

Figure 4:
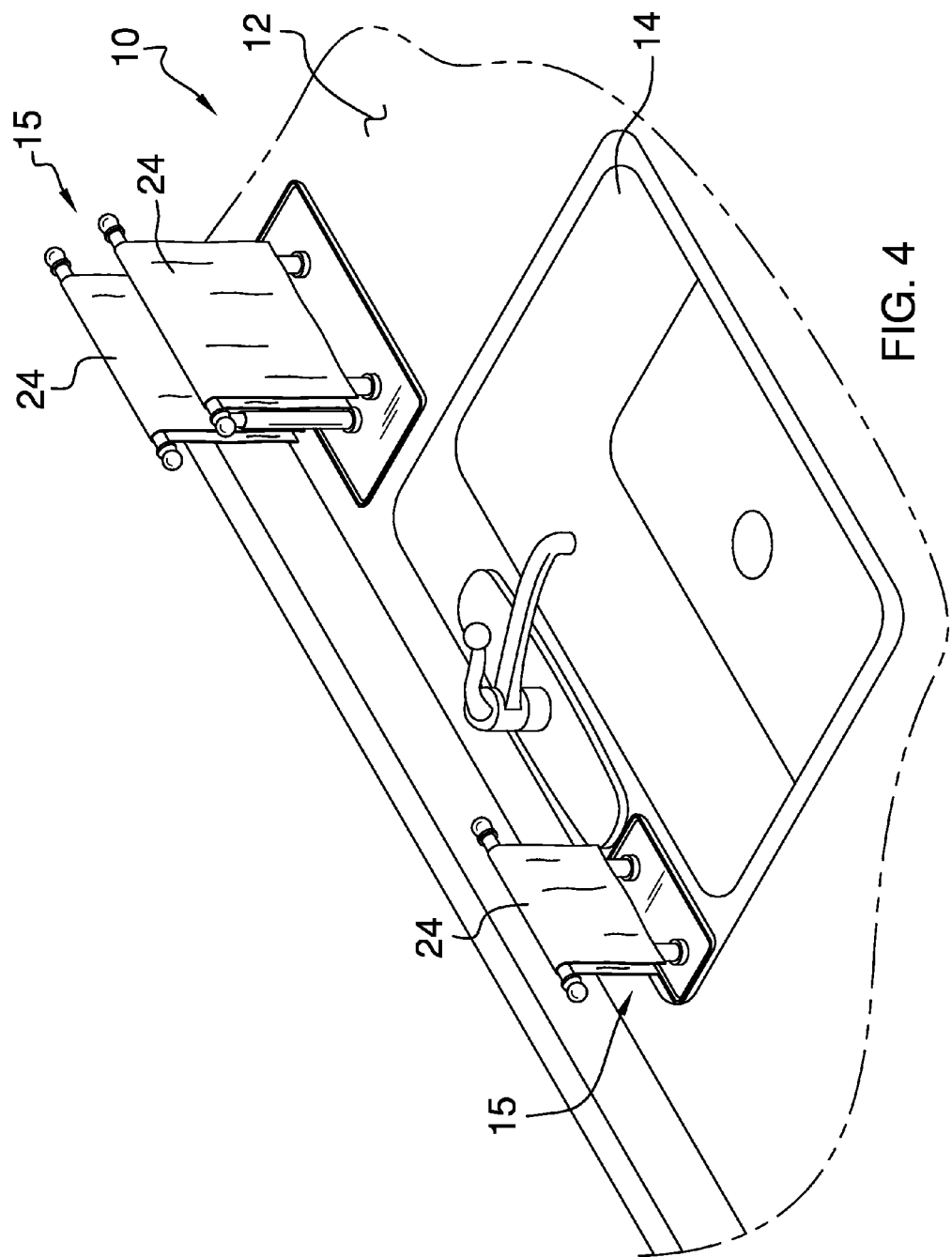
FIG. 4 is a perspective in-use view of an embodiment of the disclosure.

In use, one or more dishcloths 24 are provided which are wet, such as after being used for cleaning dishes. The dishcloths 24 are placed on the support 15, and more particularly on the rods 28, so that the dishcloth 24 hangs from the support 15 and dries. As can be seen in FIG. 4, an embodiment may be provided having a single holder 22. Moreover, the holders 22 may include legs 26 having a fixed height.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A method of drying a dishcloth, said method comprising the steps of:
   providing a countertop;
   providing a support and positioning said support on said countertop such that said support extends upwardly from said countertop, said support including:
      a panel having an upper surface and a perimeter edge, said upper surface being planar, said panel having a length and width each being less 18 inches;

a pair of holders, each of said holders being configured to support a dishcloth in spaced relationship from said panel, each of said holders including:
   a pair of legs, each of said legs being attached to and extending upwardly from said upper surface, each of said legs being telescopic and having a selectively adjustable height, said legs having a maximum height being less than 12 inches;
   a rod being attached to and extending between said legs, said rod being attached to an upper end of a respective one of said legs, said rod having a length between 6 inches and 12 inches;
   wherein said holders are spaced from each other a distance of between 2 inches and 6 inches, said rods of said holders being oriented parallel to each other;
providing a dishcloth, said dishcloth being wet; and
positioning said dishcloth on said support such that said dishcloth hangs from said support and dries.

\* \* \* \* \*